United States Patent [19]

Mitsuishi

[11] Patent Number: 5,432,943
[45] Date of Patent: Jul. 11, 1995

[54] DATA PROCESSING APPARATUS HAVING INTERRUPTION CONTROL UNIT

[75] Inventor: Naoki Mitsuishi, Kodaira, Japan

[73] Assignee: Hitachi, Ltd., Tokyo, Japan

[21] Appl. No.: 49,183

[22] Filed: Apr. 19, 1993

[30] Foreign Application Priority Data

Apr. 30, 1992 [JP] Japan .................................. 4-137955

[51] Int. Cl.⁶ .............................................. G06F 9/46
[52] U.S. Cl. ................................. 395/725; 364/280.8; 364/263.2; 364/241.2; 364/241.6; 364/259; 364/259.2; 364/DIG. 1
[58] Field of Search ............... 395/725, 325, 275, 700, 395/775, 650; 340/825.51; 370/85.6

[56] References Cited

U.S. PATENT DOCUMENTS

| | | | |
|---|---|---|---|
| 3,611,312 | 10/1971 | Barton | 395/725 |
| 4,003,028 | 1/1977 | Bennett et al. | 395/725 |
| 4,010,448 | 3/1977 | Bennett et al. | 395/725 |
| 4,159,516 | 6/1979 | Henrion et al. | 395/275 |
| 4,250,546 | 2/1981 | Boney et al. | 395/725 |
| 4,779,195 | 10/1988 | James | 395/275 |
| 4,825,358 | 4/1989 | Letwin | 395/700 |
| 4,930,068 | 5/1990 | Katayose et al. | 395/725 |
| 4,930,070 | 5/1990 | Yonekura et al. | 395/725 |
| 5,163,152 | 11/1992 | Okamoto | 395/725 |
| 5,283,904 | 2/1994 | Carson et al. | 395/725 |
| 5,291,603 | 3/1994 | Morse et al. | 395/725 |
| 5,349,667 | 9/1994 | Kaneko | 395/725 |

FOREIGN PATENT DOCUMENTS 58-225441 3/1987 Japan .
1-236327 4/1991 Japan .

OTHER PUBLICATIONS

"H8/330, HD67473308, HD6433308, Hardware Manual," Hitachi, Ltd., Dec. 1989, pp. 25-76. (English).
"H8/532, HD6475328, HD6435328, Hardware Manual," Hitachi, Ltd., Aug. 1989, pp. 23-73 and 91-105. (English).

Primary Examiner—Gopal C. Ray
Attorney, Agent, or Firm—Fay, Sharpe, Beall, Fagan, Minnich & McKee

[57] ABSTRACT

A data processing apparatus comprising a central processing unit including at least one first memory bit and at least one second memory bit. The central processing unit executes an interrupting process indicated by an interruption identification signal in response to a first interruption request signal and the interruption identification signal. A first designating unit generates a designation signal indicating whether the central processing unit is in a first designating state. An interruption controller receives as input at least a plurality of second interruption request signals, a first bit state signal indicative of a state of the at least one first memory bit, a second bit state signal indicative of a state of the at least one second memory bit, and the designation signal. The interruption controller accepting or masking at least one interruption request signal of the plurality of second interruption request signals on the basis of the first bit state signal and the second bit state signal in response to the designation signal indicating the first designation state. In response to the designation signal indicating a state different from the first designating state, the interruption controller accepts or masks the at least one interruption request signal of the plurality of second interruption request signals on the basis of the first bit state signal.

19 Claims, 15 Drawing Sheets

FIG. 2A

```
         BIT 7       0  7         0
        ┌─────────────┬─────────────┐
        │    R0H      │    R0L      │
        ├─────────────┼─────────────┤
GENERAL │    R1H      │    R1L      │
REGISTER├─────────────┼─────────────┤
        │    R2H      │    R2L      │
        ├─────────────┼─────────────┤
        │    R3H      │    R3L      │
        ├─────────────┼─────────────┤
        │    R4H      │    R4L      │
        ├─────────────┼─────────────┤
        │    R5H      │    R5L      │
        ├─────────────┼─────────────┤
        │    R6H      │    R6L      │
        ├─────────────┼─────────────┤
        │    R7H      │    R7L      │
        └─────────────┴─────────────┘
```

FIG. 2B

CONTROL REGISTER

BIT 7            0

CCR | I | U2 | U1 | H | N | Z | V | C |

FIG. 2C

CONTROL REGISTER

BIT 15          0

| PC |

FIG. 3A

REGISTER ICR

| BIT: | 7 | 6 | 5 | 4 | 3 | 2 | 1 | 0 |
|---|---|---|---|---|---|---|---|---|
| | U2C | — | — | — | — | — | — | — |
| INITIAL VALUE: | 0 | 0 | 0 | 0 | 0 | 0 | 0 | 0 |
| R/W: | R/W | — | — | — | — | — | — | — |

FIG. 3B

REGISTER IPR

| BIT: | 7 | 6 | 5 | 4 | 3 | 2 | 1 | 0 |
|---|---|---|---|---|---|---|---|---|
| | IPR7 | IPR6 | IPR5 | IPR4 | IPR3 | IPR2 | IPR1 | IPR0 |
| INITIAL VALUE: | 0 | 0 | 0 | 0 | 0 | 0 | 0 | 0 |
| R/W: | R/W | R/W | R/W | R/W | R/W | R/W | R/W | R/W |

FIG. 4A

WHEN U2C = 0

| CORRESPONDING PERMISSION BIT | ONE OF BITS OF IPR | I | U2 | INTERRUPTING STATE |
|---|---|---|---|---|
| 0 | – | – | – | INHIBIT |
| 1 | 0 | 0 | – | PERMIT (NON-PRIORITY) |
| 1 | 1 | 0 | – | PERMIT (PRIORITY) |
| 1 | – | 1 | – | INHIBIT |

FIG. 4B

WHEN U2C = 1

| CORRESPONDING PERMISSION BIT | ONE OF BITS OF IPR | I | U2 | INTERRUPTING STATE |
|---|---|---|---|---|
| 0 | – | – | – | INHIBIT |
| 1 | 0 | 0 | – | PERMIT (NON-PRIORITY) |
| 1 | 1 | 0 | – | PERMIT (PRIORITY) |
| 1 | 0 | 1 | – | INHIBIT |
| 1 | 1 | 1 | 0 | PERMIT |
| 1 | 1 | 1 | 1 | INHIBIT |

FIG. 5

| EXCEPTING PROCESSING FACTOR | ORIGIN OF GENERATION OF FACTOR | VECTOR NO. | CORRESPONDENCE OF INTERRUPTION CONTROL REGISTER |
|---|---|---|---|
| RESET | EXTERNAL TERMINAL | 0 | — |
| (RESERVE) | | 1 | — |
| (RESERVE) | | 2 | — |
| NMI | EXTERNAL TERMINAL | 3 | — |
| TRAP COMMAND 0 | | 4 | — |
| TRAP COMMAND 1 | | 5 | — |
| TRAP COMMAND 2 | | 6 | — |
| TRAP COMMAND 3 | | 7 | — |
| IRQ0 | EXTERNAL TERMINAL | 8 | IPR7 |
| IRQ1 | EXTERNAL TERMINAL | 9 | IPR6 |
| IRQ2 | EXTERNAL TERMINAL | 10 | IPR5 |
| IRQ3 | EXTERNAL TERMINAL | 11 | |
| IRQ4 | EXTERNAL TERMINAL | 12 | IPR4 |
| IRQ5 | EXTERNAL TERMINAL | 13 | |
| IRQ6 | EXTERNAL TERMINAL | 14 | |
| IRQ7 | EXTERNAL TERMINAL | 15 | |

FIG. 6

| EXCEPTING PROCESSING FACTOR | ORIGIN OF GENERATION OF FACTOR | VECTOR NO. | CORRESPONDENCE OF INTERRUPTION CONTROL REGISTER |
|---|---|---|---|
| CAPTURE (TAIC 0) | TIMER A | 16 | IPR3 |
| CAPTURE (TAIC 1) | | 17 | |
| CAPTURE (TAIC 2) | | 18 | |
| CAPTURE (TAIC 3) | | 19 | |
| COMPARE MATCH (TACM 0) | | 20 | |
| COMPARE MATCH (TACM 1) | | 21 | |
| OVERFLOW (TAOV) | | 22 | |
| RESERVE | | 23 | |
| COMPARE MATCH (TBCM 0) | TIMER B | 24 | IPR2 |
| COMPARE MATCH (TBCM 1) | | 25 | |
| OVERFLOW (TBOV) | | 26 | |
| RESERVE | | 27 | |
| RECEPTION COMPLETION (SREND) | SCI | 28 | IPR1 |
| TRANSMISSION COMPLETION (STEND) | | 29 | |
| RECEPTION ERROR (SERR) | | 30 | |
| RESERVE | | 31 | |
| CONVERSION END (ADEND) | A/D CONVERTER | 32 | IPR0 |
| RESERVE | | 33 | |
| RESERVE | | 34 | |
| RESERVE | | 35 | |

DATA PROCESSING APPARATUS HAVING INTERRUPTION CONTROL UNIT

BACKGROUND OF THE INVENTION

The present invention relates to a data processing apparatus and, more particularly, to a technique which is effective when it is used in an interruption control apparatus of a microcomputer.

A central processing unit (CPU) of a microcomputer includes: a data register or an address register called a general register, accumulator, index register, or the like; a program counter; and a control register such as a condition code register or the like as disclosed in, for example, "H8/330, HD6473308, HD6433308, Hardware Manual", Hitachi Ltd., pages 23 to 60 and 71 to 84, published on August, 1989, (corresponding English Version, "H8/300, HD6473308, HD6433308, Hardware Manual", pages 25 to 76, published on December, 1989).

Such a condition code register includes flags which reflect the results of data processes of the CPU: for instance, a zero flag, a negative flag, a carry flag, an overflow flag, and a half carry flag. For example, when the CPU executes the addition, if a carry occurs, the carry flag is set to 1. If no carry occurs, the carry flag is cleared to 0.

The microcomputer has what is called an interrupting function such that when an external factor which is independent of the process of the CPU occurs or when a predetermined operation of a built-in functional block (timer or the like) occurs, the process of the CPU is temporarily interrupted, thereby enabling the process corresponding to the external factor or the operation of the functional block to be executed. When the CPU executes such an interrupting function, the contents in the program counter and condition code register are saved to the outside of the CPU, namely, into what is called a stack area. On the other hand, when the execution of the above interrupting process is finished, a return command is executed and the process of the CPU is returned to the state before execution of the interrupting function. The saved contents of the program counter and the condition code register are recovered.

For instance, the CPU disclosed in the above "H8/330, HD6473308, HD6433308, Hardware Manual", Hitachi Ltd., pages 23 to 60 and 71 to 84, published on August, 1989, includes sixteen general registers each having a 8-bit construction, a 16-bit program counter, and an 8-bit condition code register. In addition to the zero flag, negative flag, and the like, an interruption mask bit and user's bits of two bits are included in the condition code register. When "1" is set into the interruption mask bit, the interruption is inhibited. When the interruption mask bit is cleared to "0", the interruption is permitted. When the interrupting function is executed, the interruption mask bit is set to "1". The condition code register changes due to the reflection of the result of the data process and the execution of the interrupting function as mentioned above. The condition code register can be also operated (set/reset) by a software program through a logical arithmetic operation with immediate data or the like. The 2-bit user's bits are not changed due to the result of the data process or the execution of the interrupting function but can be changed only by a software program. The user's bits are automatically saved upon execution of the interrupting function and is returned by a return command and can be used for management of softwares or the like because of the nature such that it doesn't depend on the result of data process. By using the user's bits, the softwares can be easily managed and the executing efficiency can be improved.

Each of the external factor as an interruption requesting side or a factor of the functional block has a permission bit. A status of the permission bit is set by the CPU and is used to perfectly inhibit the interruption from peripheral circuits such that they are not used on a system or the like. When the permission bit has been cleared to "0", no interruption is requested to the CPU irrespective of the external factor or the operation of the functional block corresponding to the permission bit. When the permission bit has been set to "1", the interruption is requested by the external factor or the predetermined operation of the functional block corresponding to the permission bit. The CPU can inhibit the interruption by the interruption mask bit. Namely, even when the interruption is requested, so long as the interruption mask bit has been set to "1", such an interruption request is reserved until the interruption mask bit is cleared to "0". When the interruption is requested, so long as the interruption mask bit has been cleared to "0", such an interruption request is accepted to the CPU at a time point of the end of the command which is being executed. The interrupting process is executed.

SUMMARY OF THE INVENTION

The CPU has only one interruption mask bit. Therefore, only two kinds of states such that all of the interruption requests are enabled to be accepted or all of the interruption requests are reserved can be selected. To enable only a part of a plurality of interruption requests to be accepted, it must use the permission bit. For example, in the case where during the execution of a certain interrupting process, a part of the interruption requests is enabled to be accepted and the other interruption requests are reserved, the CPU reads the permission bits allocated in independent addresses which are respectively provided for the interruption requesting sides. The CPU subsequently saves the read-out permission bits into, for example, a RAM and, after that, the bits which are enabled to be accepted must be set to "1" and the bits to be reserved must be cleared to "0". On the other hand, the saved permission bits must be recovered at the final stage of the interrupting process. Such operations are complicated as compared with processing contents and need a large program capacity and a long execution time.

On the other hand, the CPU as disclosed in "H8/532, HD6475328, HD6435328, Hardware Manual", Hitachi Ltd., pages 23 to 60 and 89 to 102, published on December, 1988, (corresponding English version, "H8/532, HD6475328, HD6435328, Hardware Manual". pages 23 to 73 and 91 to 105, published on August, 1989) has interruption mask bits of three bits, therefore, has eight interruption permission levels. According to the examinations of the inventors of the present invention, however, the following points have been clarified. First, in case of a system of a relatively small scale or the like, there is also a system which hardly uses all of the eight interruption permission levels in accordance with an application system of the CPU. When the CPU having eight interruption permission levels is used in every application field, a vain occurs in the logical and physical scales of the CPU. The number of necessary interruption permission levels is not always fixed. It is necessary to change the number of necessary interruption permission levels in accordance with an executing state of the interrupting process. However, a large number of bits, namely, a large number of registers are inevitably necessary to set eight permission levels. To reset the write permission levels, a large program capacity and a longer execution time are expended.

It is an object of the present invention to provide a data processing apparatus which can efficiently execute interrupting processes while maintaining a high executing efficiency of softwares and minimizing increases in physical and logical scales.

To accomplish such an object, a data processing apparatus according to one aspect of the present invention comprises: a central processing unit which has at least one first memory bit and at least one second memory bit and which executes an interrupting process indicated by an interruption identification signal in response to a first interruption request signal and said interruption identification signal; a first designating unit to generate a designation signal indicating whether a state is a first designating state or not; and an interruption control unit which is constructed in a manner such that a plurality of second interruption request signals respectively corresponding to a plurality of interruption factors, a first bit state signal indicative of a state of the at least one first memory bit, a second bit state signal indicative of a state of the at least one second memory bit, and the designation signal are inputted, and in the case where the designation signal indicates the first designating state, each of a plurality of second interruption request signals is accepted or masked on the basis of both of the first and second bit state signals, and in the case where the designation signal doesn't indicate the first designating state, each of the plurality of second interruption request signals is accepted or masked on the basis of the first bit state signal and irrespective of the second bit state signal, the interruption identification signal corresponding to one of the one or more signals accepted is supplied to the central processing unit, and the first interruption request signal is supplied to the central processing unit in response to one of the one or more signals accepted.

According to the above data processing apparatus, in the case where the designation signal doesn't indicate the first state, the second bit can be used as the foregoing user's bit. By using the second bit as the user's bit, accordingly, the software can be easily managed and the executing efficiency can be improved. In the case where the designation signal indicates the first state, the second bit is used as an interruption mask bit. When the second bit which can be used as a user's bit is used as an interruption mask bit, a high efficiency or a high function of the interrupting process is realized while minimizing increases in physical and logical scales. Further, whether the second bit is used as an interruption mask bit or a user's bit can be selected by circumstances of the software or hardware. Accordingly, a high efficiency of the interrupting process is realized while keeping an executing efficiency of the software.

In the case where the designation signal doesn't indicate the first designating state, the state of the second memory bit can be also changed in response to only a predetermined command which is executed by the central processing unit.

The first designating unit can also generate the designation signal in accordance with a predetermined command which is executed by the central processing unit.

The first designating unit can be also provided in an address space of the central processing unit.

The interruption control unit can be also provided in an address space of the central processing unit.

In the case where the designation signal indicates the first designating state, the interruption control unit is constructed in the following manner. Namely, (a) in the case where the first bit state signal indicates the first state, the interruption control unit accepts all of the plurality of second interruption request signals without masking. (b) In the case where the first bit state signal indicates the second state and the second bit state signal indicates a third state, the interruption control unit accepts a part of the plurality of second interruption request signals and masks the remaining second interruption request signals. (c) In the case where the first bit state signal indicates the second state and the second bit state signal indicates a fourth state, the interruption control unit masks all of the plurality of second interruption request signals.

The data processing apparatus further has a second designating unit to designate the above part of the plurality of second interruption request signals.

The second designating unit can also designate the part of the plurality of second interruption request signals in accordance with a predetermined command which is executed by the central processing unit.

The second designating unit includes a plurality of third memory bits. Each of the plurality of third memory bits correspond to either one or more signals among the plurality of second interruption request signals. Each of the plurality of second interruption request signals correspond to either one of the plurality of third memory bits. In the case where each of the plurality of third memory bits is set into the first state, the one or more signals which correspond to the third memory bits are included in the part of the second interruption request signals.

In the case where each of the plurality of third memory bits is set into the second state, one or more signals which have been made correspond to the third memory bits can be also included in the remaining second interruption request signals.

The states of the plurality of third memory bits can be also changed in accordance with a predetermined command which is executed by the central processing unit.

In the case where the designation signal doesn't indicate the first designating state, the interruption control unit is constructed in the following manner. (a) In the case where the first bit state signal indicates the first state, the interruption control unit accepts all of the plurality of second interruption request signals. (b) In the case where the first bit state signal indicates the second state, the interruption control unit can also mask all of the plurality of second interruption request signals.

At least one third interruption request signal corresponding to a predetermined interruption factor is further inputted to the interruption control unit. The interruption control unit can always accept the at least one third interruption request signal irrespective of the first and second bit state signals.

The data processing apparatus has a plurality of signal generating sections for generating the plurality of second interruption request signals. Each of the plurality of signal generating sections has a fourth memory bit. In the case where the fourth memory bit is set in the first state, each of the plurality of signal generating sections generates the second interruption request signal. In the case where the fourth memory bit is set in the second state, each of the plurality of signal generating sections doesn't need to generate the second interruption request signal.

The states of the plurality of fourth memory bits can be also changed in accordance with a predetermined command which is executed by the central processing unit.

The central processing unit has a condition code register. The at least one first memory bit and the at least one second memory bit can be also included in the condition code register.

A data processing apparatus according to another aspect of the present invention comprises: a central processing unit which has at least one memory bit and executes an interrupting process indicated by an interruption identification signal in response to a first interruption request signal and the interruption identification signal; a first designating unit to generate a designation signal indicating whether a state is a first designating state or not; and an interruption control unit which is constructed in a manner such that a plurality of second interruption request signals respectively corresponding to a plurality of interruption factors, a bit state signal indicative of the state of the at least one memory bit, and the designation signal are inputted, and in the case where the designation signal indicates the first designating state, each of the plurality of second interruption request signals is accepted or masked on the basis of the bit state signal, and in the case where the designation signal doesn't indicate the first designating state, each of the plurality of second interruption request signals is accepted or masked irrespective of the bit state signal, the interruption identification signal corresponding to one of the one or more signals accepted is supplied to the central processing unit, and the first interruption request signal is supplied to the central processing unit in response to one of the one or more signals accepted.

In the case where the designation signal doesn't indicate the first designating state, the state of the second memory bit can be also changed in response to only a predetermined command which is executed by the central processing unit.

The central processing unit has a condition code register. The at least one memory bit can be also included in the condition code register.

The above and other objects and novel features of the present invention will become apparent from the following detailed description and the appended claims with reference to the accompanying drawings.

BRIEF DESCRIPTION OF THE DRAWINGS

FIGS. 2A to 2C are diagrams showing examples of constructions of registers of a CPU of the single chip microcomputer;

FIGS. 3A and 3B are diagrams showing examples of constructions of registers of an interruption control circuit of the single chip microcomputer;

FIGS. 4A and 4B are explanatory diagrams showing interruption permitting states of the single chip microcomputer;

FIG. 5 is a diagram showing interruption factors of the single chip microcomputer;

FIG. 6 is a diagram showing other interruption factors of the single chip microcomputer;

DESCRIPTION OF THE PREFERRED EMBODIMENTS

A data processing apparatus according to the present invention will now be described hereinbelow with reference to the drawings.

Figure 1:
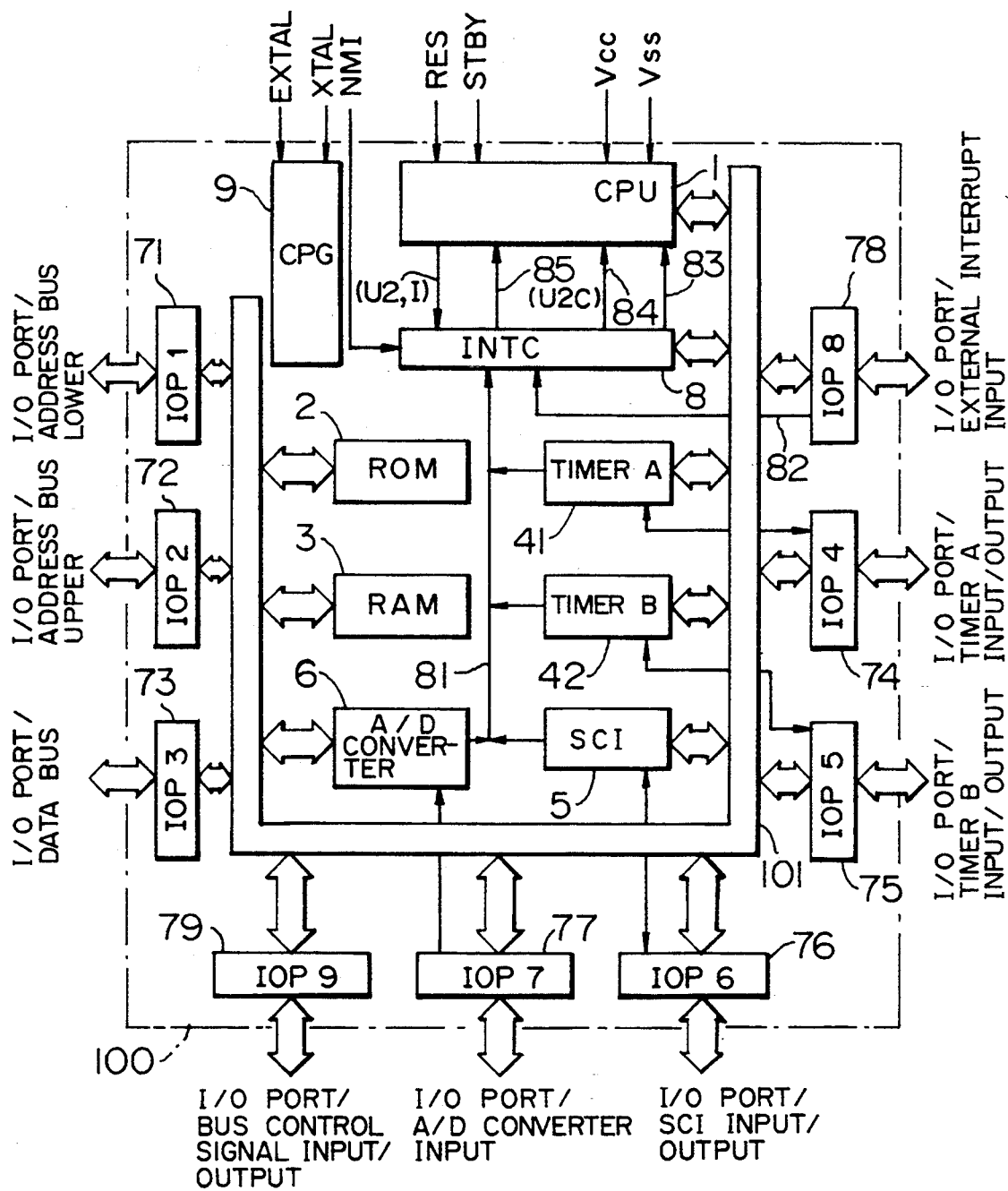
FIG. 1 is a block diagram showing a single chip microcomputer as a data processing apparatus according to an embodiment of the present invention.

FIG. 1 shows a single chip microcomputer as a data processing apparatus according to an embodiment of the present invention.

A single chip microcomputer 100 shown in FIG. 1 comprises: a CPU (central processing unit) 1 to control a whole apparatus; an ROM (read only memory) 2 in which operation programs of the CPU 1 and the like have been stored; a RAM (random access memory) 3 which is used as a work area of the CPU 1, a temporary storing area of data, or the like; a timer A 41; a timer B 42; a serial communication interface (SCI) 5; an A/D converter 6; input/output circuits 71 to 79; and an interruption control circuit (INTC) 8. Those component elements are mutually connected by an internal bus 101. Although not particularly limited, the internal bus 101 includes an address bus to which an address signal is supplied, a data bus to which data is supplied, and a control bus to which a read signal, a write signal, a system clock, or the like are supplied. The input/output circuits 71 to 79 are commonly used by a predetermined same kind of component elements such as external buses of the CPU 1, timers A 41 and B 42, input/output terminals of the SCI 5, input terminals of external interruption signals, or the like. For example, the input/output circuits 71 and 72 are commonly used by an address bus. The input/output circuit 73 is commonly used by the data bus. The input/output circuits 74, 75, 76, and 77 are commonly used by the timers A 41 and B 42, SCI 5, and A/D converter, respectively. The input/output circuit 78 is commonly used by the external interruption. The input/output circuit 79 is commonly used by an external bus control signal. The above single chip microcomputer 100 is formed on one semiconductor substrate such as a silicon substrate by a well-known semiconductor integrated circuit manufacturing technique.

The single chip microcomputer 100 executes operations on the basis of a reference clock ($\phi$) which is generated from a quartz oscillator that is connected to terminals EXTAL and XTAL of a clock pulse generator (CPG) 9 or which is generated from an external clock that is inputted from the outside to the terminal EXTAL. The minimum unit of the reference clock ($\phi$)

is called a state. Vss and Vcc which are representatively shown in the diagram denote power source terminals; RES a reset signal input terminal; and STBY a standby signal input terminal.

FIGS. 2A to 2C show examples of constructions of registers of the CPU 1 of an embodiment of the data processing apparatus according to the invention.

The CPU 1 includes: sixteen general registers R0H to R7H and R0L to R7L each of which is constructed by eight bits and shown in FIG. 2A; a program counter PC of a 16-bit construction shown in FIG. 2C; and a condition code register CCR of an 8-bit construction shown in FIG. 2B. In addition to a zero flag Z, a negative flag N, a carry flag C, an overflow flag V, and a half carry flag H, an interruption mask bit I and user's bits U1 and U2 of two bits are included in the condition code register CCR. When the interruption mask bit I is set to "1", the interruption is inhibited When the interruption mask bit I is cleared to "0", the interruption is permitted. When the interrupting function is executed, the interruption mask bit I is set to "1". The condition code register CCR is changed by the reflection of the result of data process and the execution of the interrupting function. Further, logical arithmetic operations with immediate data can be executed to the condition code register CCR. Moreover, data can be transferred between the condition code register CCR and a predetermined general register. The CCR can be operated (set/reset) by a software program. The user's bits U1 and U2 of two bits are not changed by the result of the data process and the execution of the interrupting function but are changed by only the software program. There are the OR, AND, and exclusive OR as the logical arithmetic operations. The user's bits U1 and U2 are automatically saved at the time of execution of the interrupting function and are recovered by a return command. The user's bits U1 and U2 can be used for management of software or the like because they do not depend on the result of the data process. By using the user's bits U1 and U2, software can be easily managed and its executing efficiency can be improved.

The interruption control circuit (INTC) 8 shown in FIG. 1 receives an internal interruption signal (interruption factor) 81 such as a signal from the timer A 41, timer B 42, SCI 5, or built-in input/output circuit of the A/D converter 6. The INTC 8 also receives an external interruption signal 82 from the input/output circuit (IOP8) 78 which is commonly used by the external interruption. The INTC 8 checks the state of the interruption mask bit I of the CPU 1 and supplies an interruption request 83 and a vector number (interruption identification signal) 84 corresponding to the interruption requested by the signal 81 or 82 to the CPU 1. Each of the built-in input/output circuits has an interruption permission bit. The interruption request which is set to correspond to each built-in input/output circuit is formed on the basis of an AND signal of the interruption factor 81 and the interruption permission bit. Similarly, the external interruption signal is also formed on the basis of an AND signal of the interruption signal 82 and the interruption permission bit (interruption permission bit which an external circuit for generating the external interruption signal 82 has). When the interruption request 83 is set to the "1" level, the CPU 1 executes an interruption excepting process, which will be explained hereinafter, at a time point of the end of a predetermined command. The CPU 1 extracts a branch destination address from the address corresponding to the vector number 8 and executes the interruption processing program from such a branch destination address.

In the embodiment, the interruption control circuit (INTC) 8 is provided in an address space of the CPU 1.

In the embodiment, further, the interruption control circuit (INTC) 8 generates a control signal 85 to the CPU 1. The CPU i generates the state of the user's bit U2 (also referred to as a U2 bit) of bit 6 (the seventh bit from the lower side) of the condition code register CCR. The control signal 85 selects whether the U2 bit is further used as an interruption mask bit of another bit or is used as a user's bit.

FIGS. 3A and 3B show examples of constructions of registers of the interruption control circuit 8.

As registers of interruption control circuit 8, there are an interruption control register ICR and an interruption priority control register. The registers ICR and IPR are connected to the internal bus 101 and are constructed so as to be accessed from the CPU 1 through the internal bus. That is, the high level state "1" or low level state "0" of the data of each bit of the registers ICR and IPR is determined by the CPU 1. For example, as shown in FIG. 3A, the register ICR is constructed by a U2C bit of one bit. When the U2C bit is set to "1", the U2 bit of the condition code register CCR is used as a second interruption mask bit. When the U2C bit is cleared to "0", the U2 bit is used as a user's bit. The content of the U2C bit is set to the control signal 85.

When the U2C bit is set to "1", the bits which function as interruption mask bits are a total of the two bits I bit and U2 bit. The interruption mask level of the CPU 1 can be set by a combination of those two bits. Each interruption permission level is set by the content of the register IPR, namely, IPR0 to IPR7 as shown in FIG. 3B.

For example, in the register ICR, when the initial value of the U2C bit as bit 7 is equal to 0, the reading/writing operation can be performed. As for the remaining seven bits, the reading/writing operation is invalid. However, when those seven bits are read, "0" is read. In the register IPR, when the initial values of all bits are equal to 0, the reading/writing operation can be performed. In the embodiment, the U2C bit is set in accordance with a predetermined command which is executed by the CPU 1. The content of the U2C bit is used as a designation signal indicative of a designating state.

FIGS. 4A and 4B show a setting method of an interruption permission level.

In a state in which the U2C bit has been cleared to "0", the bit which functions as an interruption mask bit is only one bit. The interruption request in which the corresponding permission bit has been set to "1" is permitted when the interruption mask bit is cleared to "0". Such an interruption request is inhibited when the interruption mask bit I is cleared to "0". The interruption request is inhibited when the interruption mask bit I is set to "1". In the permitting state, priority (corresponding bit is set to "1")/non-priority (corresponding bit is set to "0") is designated in accordance with the contents of the bits IPR0 to IPR7 of the register IPR. When a plurality of interruptions are simultaneously requested, the priority interruption is preferentially accepted.

On the other hand, in a state in which the U2C has been set to "1", the bit which functions as an interruption mask bit is both of the I bit and U2 bit. In addition to the above states, even when the interruption mask bit has been set to "1", a predetermined interruption corresponding to the bit which has been set to "1" in the register IPR can be permitted by clearing the U2 bit to "0". Therefore, by keeping the corresponding bit of the register IPR to "0" or by setting the U2 bit to "1", a similar result is obtained in case of the CPU having the interruption mask bit of one bit.

Therefore, by clearing the U2C bit to "0" in the initial state, the software or program, formed on the basis of the well-known single chip microcomputer having the interruption mask bit of only one bit, can be applied to the single chip microcomputer 100 according to the embodiment directly or with slight modification.

FIGS. 5 and 6 show examples of exceptional processing vector tables of the single chip microcomputer 100.

As shown in FIGS. 5 and 6, there are the following kinds of interruption: reset; NMI (interruption which cannot be masked); commands (TRAP command 0 to TRAP command 3) which are executed by the CPU 1; eight interruptions (IRQ0 to IRQ7) by external terminals; seven interruptions of the timer A 41 (capture TAIC0 to TAIC3, compare matches TACM0 and TACM1, overflow TAOV); three interruptions of the timer B 42 (compare matches TBCM0 and TBCM1, overflow TBOV); three interruptions of SCI 5 (reception completion SREND, transmission completion STEND, reception error SERR); and one interruption of the A/D converter 6 (conversion end ADEND). NMI denotes a highest interruption which is always accepted irrespective of the states of the interruption mask bit I and U2 bit. The other interruptions are controlled by the permission bit which each peripheral circuit has, the settings (IPR0 to IPR7) of the register IPR, I bit, and U2 bit. The IPR is constructed by eight bits and the bits (IPR0 to IPR7) are distributed and allocated in accordance with predetermined factors as shown in FIGS. 5 and 6. As for IRQ0 and IRQ1, priority can be independently set by the IPR0 and IPR1 bits, respectively. As for the other interruptions, the priority can be set with respect to a plurality of interruptions in a lump. For instance, the priority of the interruption of the built-in input/output circuit can be set every functional block. Each interruption permission bit of the functional block can be arranged in one register. Therefore, even when the interruptions are set to the same priority in the IPR, the operation to permit a part of the interruptions and to inhibit the others can be easily performed. When the interruptions of the same priority occur, they are accepted in accordance with the order from the small vector number. Since the function and operation of each interruption are not directly concerned with the present invention, their detailed descriptions are omitted.

Figure 7A:
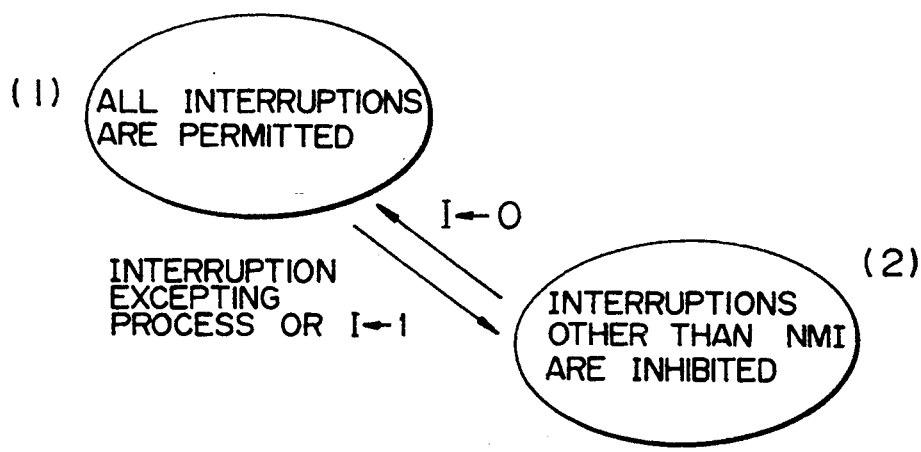
FIGS. 7A and 7B are transition diagrams of interruption permitting states of the single chip microcomputer.
Figure 7B:
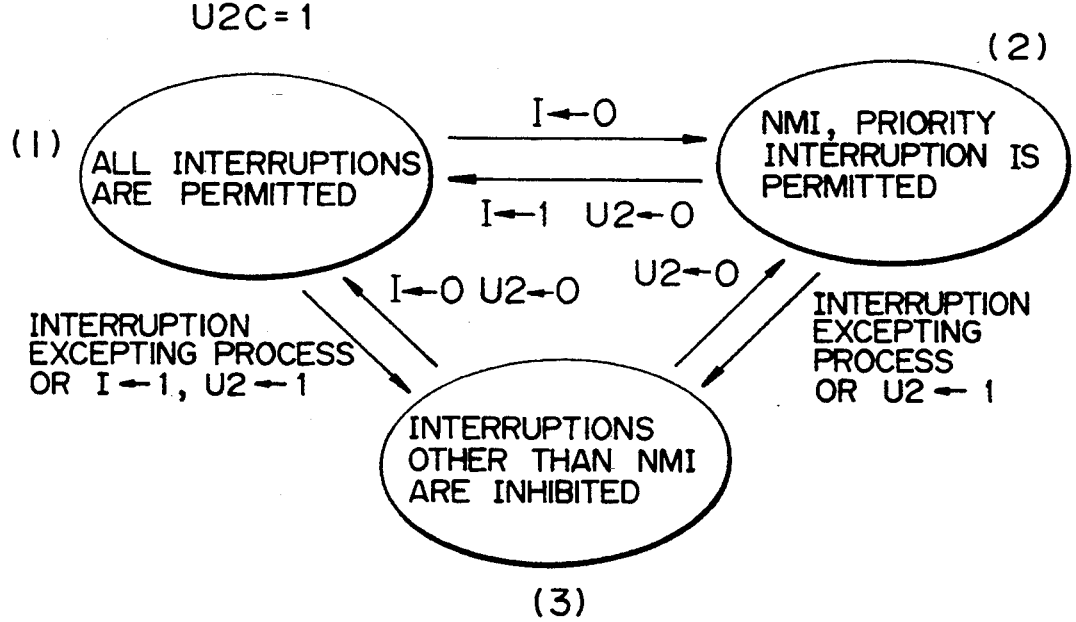

FIGS. 7A and 7B show state transition diagrams of the interruption permission levels.

As shown in FIG. 7A, in a state in which the U2C bit has been set to "0", the following two states exist.
(1) All interruption permitting state in which one bit has been cleared to "0".
(2) Permitting state of only NMI in which the I bit has been set to "1".

When the CPU 1 accepts the interruption, the I bit is set to "1" and the state is shifted to the state (2). The state is shifted to the state (1) by the above logical arithmetic operation.

As shown in FIG. 7B, in a state in which the U2C bit has been set to "1", the following three states exist.
(1) All interruption permitting state in which the I bit has been cleared to "0".

(2) Priority interruption permitting state in which the I bit has been set to "1" and the U2 bit has been cleared to "0".
(3) Permitting state of only NMI in which both of the I bit and the U2 bit have been set to "1".

When the CPU 1 accepts the interruption, the I bit and U2 bit are set to "1" and the state is shifted to the state (3). The state is shifted to the state (1) or (2) by the above logical arithmetic operation.

After resetting, the U2C bit has been cleared to "0", an initializing program is necessary. Such an initializing program can be described when it is expressed in accordance with a mnemonic of the CPU disclosed in, for example, "H8/330, HD6473308, HD6433308, Hardware Manual", Hitachi Ltd., published on August, 1985. INIT denotes an initial set value of IPR. # indicates immediate data (immediate value) and H' indicates a hexadecimal notation.

| (1) ORC | #H'40,CCR |
| (2) MOV.B | #INIT, R0L |
| (3) MOV.B | R0L, @IPR |
| (4) BSET | #7, @ICR |

The line (1) gets the OR of the CCR and "40", namely, indicates that the U2 bit of the CCR is set to "1". The line (2) shows that the data INIT is stored into the general register R0L. The line (3) shows that the content in the general register R0L is transferred to the IPR register. The line (4) shows that the U2C bit of the register ICR is set to "1".

Programs at the start and end of the interrupting process will now be described.

After one interruption was executed, it is sufficient to clear the interruption mask bit I or the U2 bit to "0" in accordance with the priority of such an interruption. In case of executing sequential processes, when the operator wants to accept only the interruption request of a special factor in the relevant interrupting program, it is sufficient that the content in the register IPR is saved by the software and the corresponding bit of the register IPR corresponding to the interruption which the operator wants to accept is set to "1" and the other bits are cleared to "0". After that, it is sufficient to clear the U2 bit to "0" while setting the I bit to "1". As such a special interruption, for example, an overflow of the timer A 41 or B 42, an abnormality process such as a reception error, or the like can be considered.

Therefore, the above program can be described as follows when it is expressed in accordance with, for example, the mnemonic. NEW indicates a set value of IPR.

| (1) MOV. B | @IPR, R0L |
| (2) PUSH. B | R0L |
| (3) MOV. B | #NEW, R0L |
| (4) MOV. B | R0L, @IPR |
| (5) ANDC | #H'BF, CCR |
| (Interruption processing program) | |
| (6) POP. B | R0L |
| (7) MOV. B | R0L, @IPR |
| (8) RTE | |

In the above program description, the content in the register IPR is first saved into the stack area via the general register R0L at the head after completion of the interruption excepting process (lines (1) and (2)). After that, the new set value of the register IPR is set into the register IPR via the general register ROL (lines (3) and (4)). Until now, the I bit and U2 bit are set and held to "1" by the interruption excepting process and the interruptions other than the NMI interruption are not accepted. After the new priority interruption was set, the U2 bit is cleared (line (5)), thereby setting the above interruption into the permitting state. During the execution of the interruption processing program, only the interruption in the permitting state and the NMI interruption can be accepted. After completion of a predetermined interrupting process, the saved content of the register IPR is returned to the register IPR via the general register ROL (lines (6) and (7)). By executing an RTE command, a processing routine is returned to the program which is being executed before the interruption excepting process (line (8)). The contents in the condition code register CCR is returned to the content before interrupting process are returned to the contents before the interrupting process by executing the RTE command.

Figure 8:
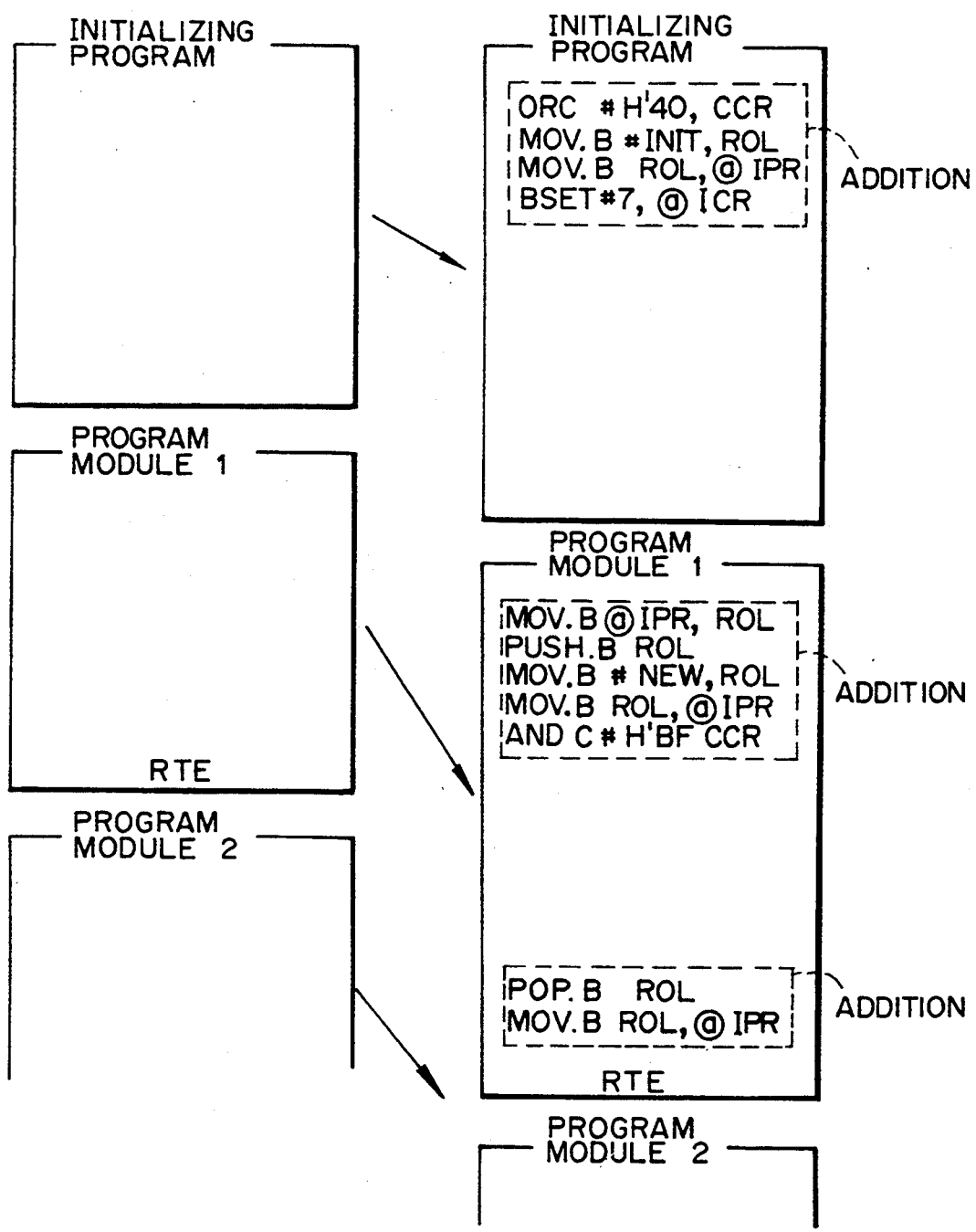
FIG. 8 is a diagram showing an example of program transfer method for the CPU.

FIG. 8 shows an example of a program in the case where the software or program formed on the basis of the well-known single chip microcomputer (for example, microcomputer disclosed in "H8/330, HD6473308, HD6433308, Hardware Manual", Hitachi Ltd., published on August, 1985) having only the interruption mask bit of one bit is transferred into the single chip microcomputer 100 in the embodiment.

As shown in FIG. 8, there is no need to change each portion of the modules software or program as an original of the transfer. It is sufficient to insert the former half portion of the above program example to the head of the interruption processing program and to insert the latter half portion to the last of the interruption processing program. As shown in FIG. 8, it is sufficient to insert the above program example to the head of the initializing program. Such a change can be easily performed with respect to each module of the software or program in addition to the interruption processing program.

A program capacity increases due to such a transfer. However, such an increase in program capacity is smaller than a whole program capacity of the single chip microcomputer, for example, 16 k bytes and it is considered that a large problem is not caused. On the other hand, there is a case as mentioned above such that in order to enable a part of the interruptions to be accepted and to reserve the others during the execution of a certain interrupting process, the permission bit arranged in the independent address is saved and, after that, the bit which is enabled to be accepted is set to "1", the bits to be reserved are cleared to "0", and the operation to recover the permission bit saved to the last of the interrupting process is further executed. As compared with the case as mentioned above, the program which is necessary in such a case can be deleted in the embodiment, so that a whole program capacity is reduced.

Figure 9:
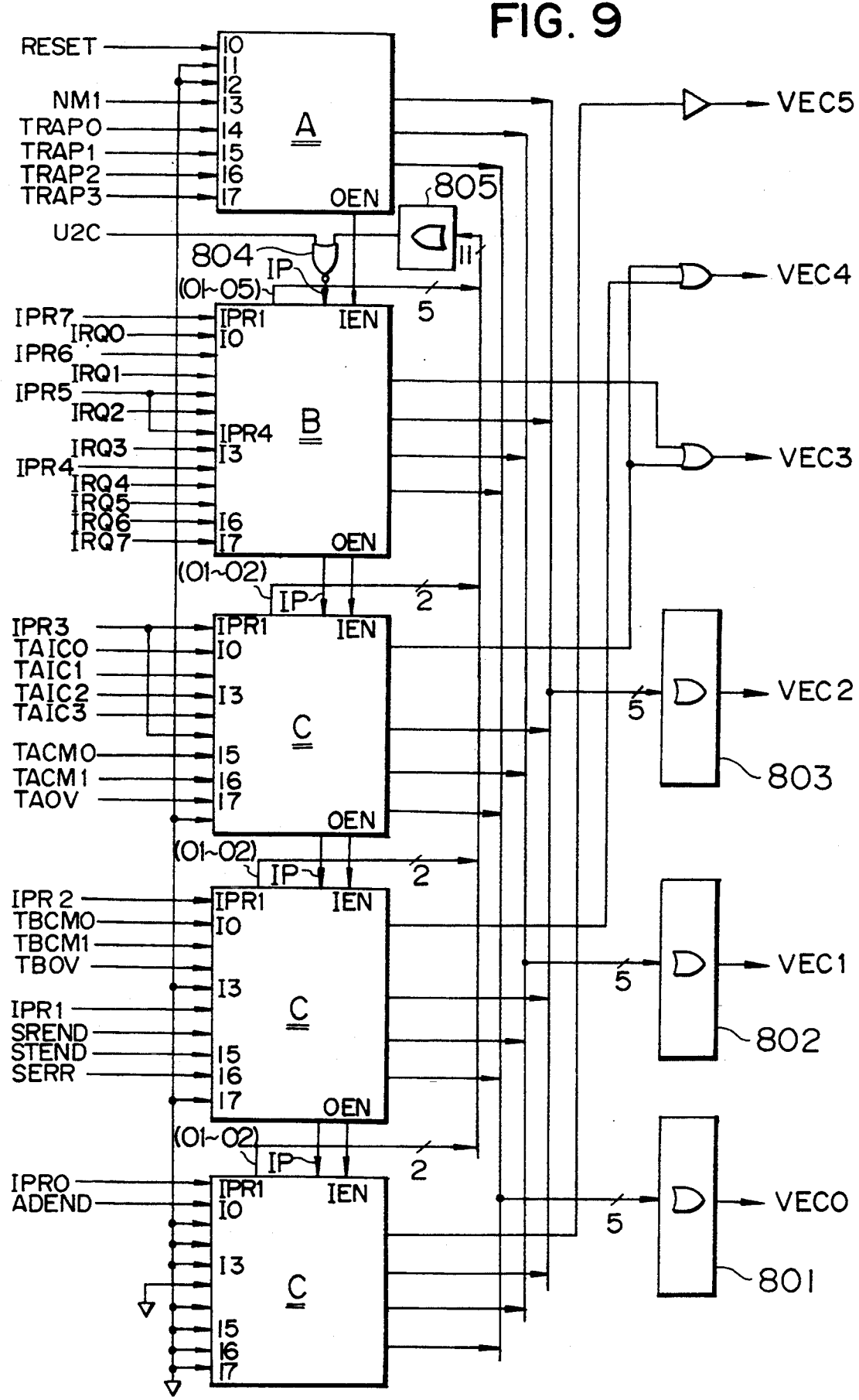
FIG. 9 is a diagram showing a priority judging circuit included in the interruption control circuit.

FIG. 9 shows a practical example of a priority judging circuit which is included in the interruption control circuit 8.

Figure 10:
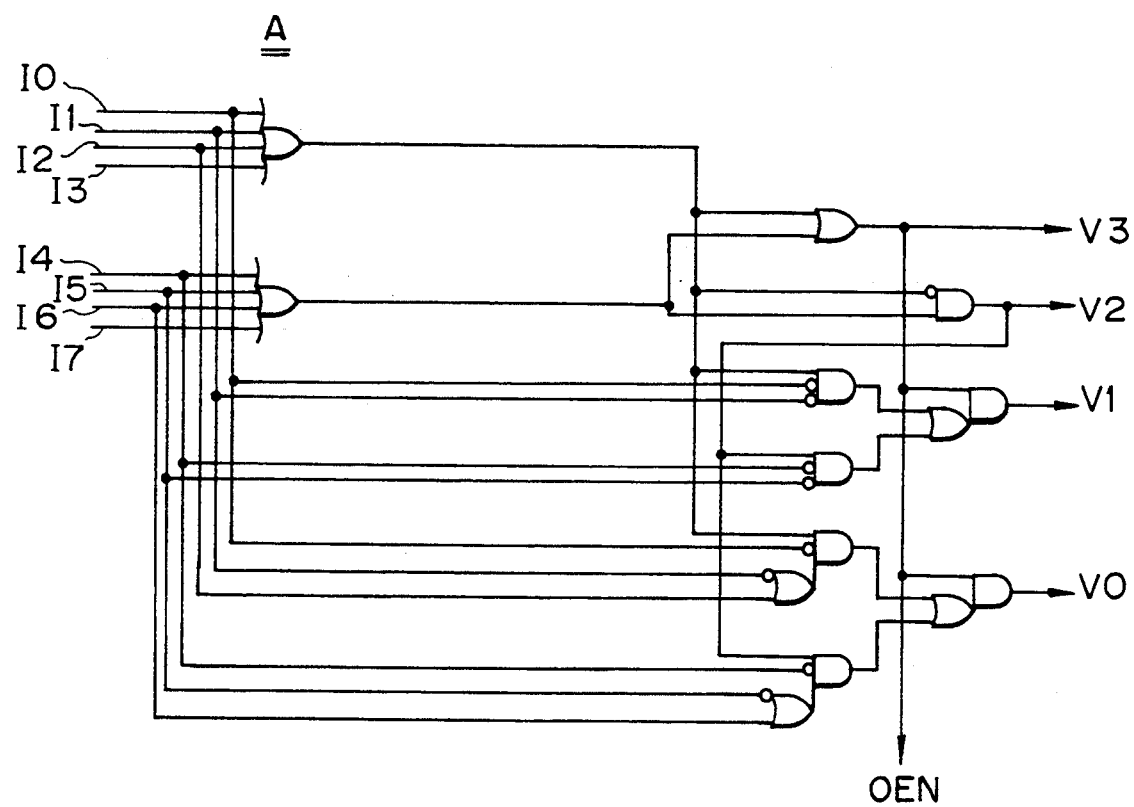
FIG. 10 is a circuit diagram showing an example of a circuit block A included in the priority judging circuit.
Figure 11:
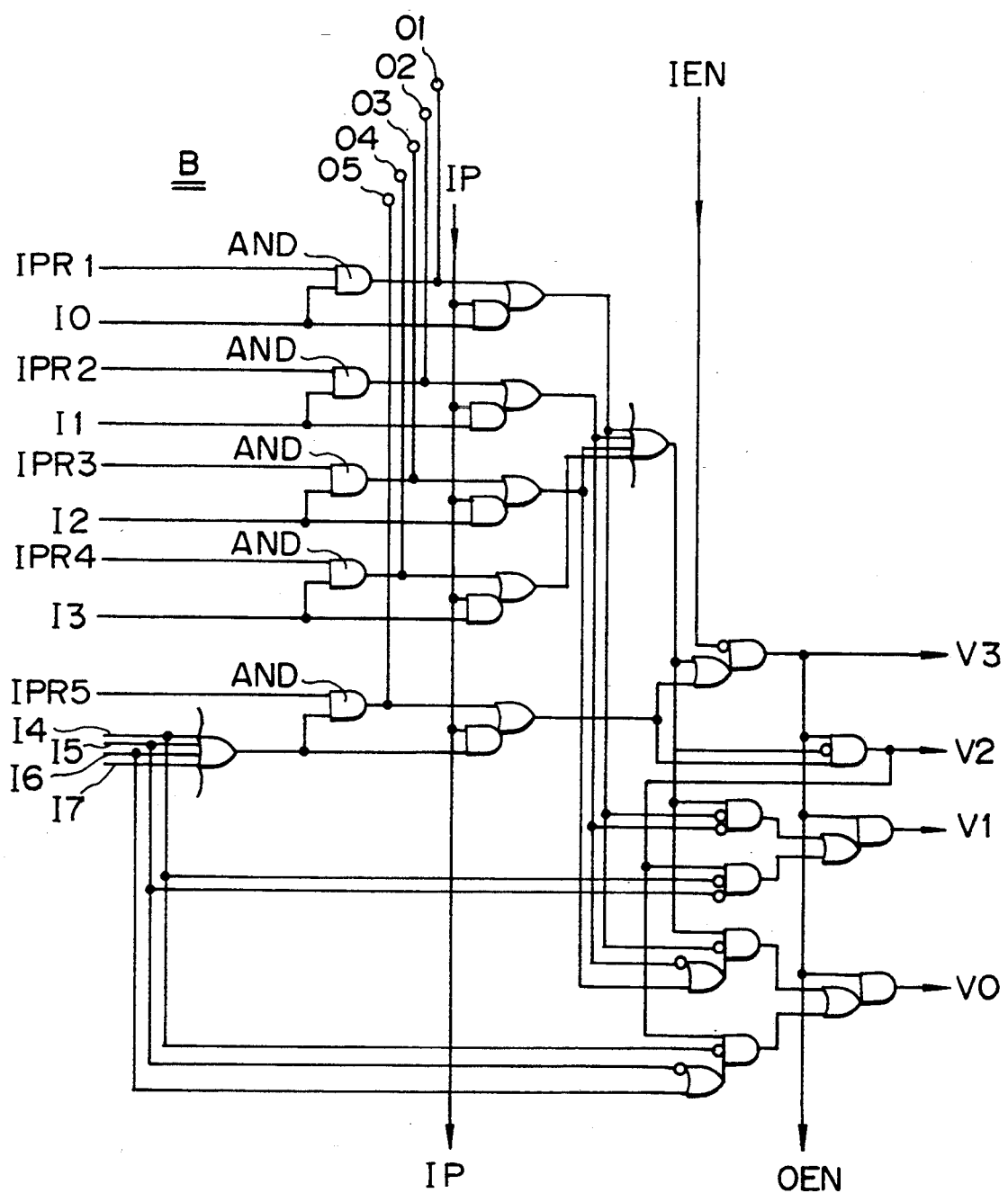
FIG. 11 is a circuit diagram showing an example of a circuit block B included in the priority judging circuit.
Figure 12:
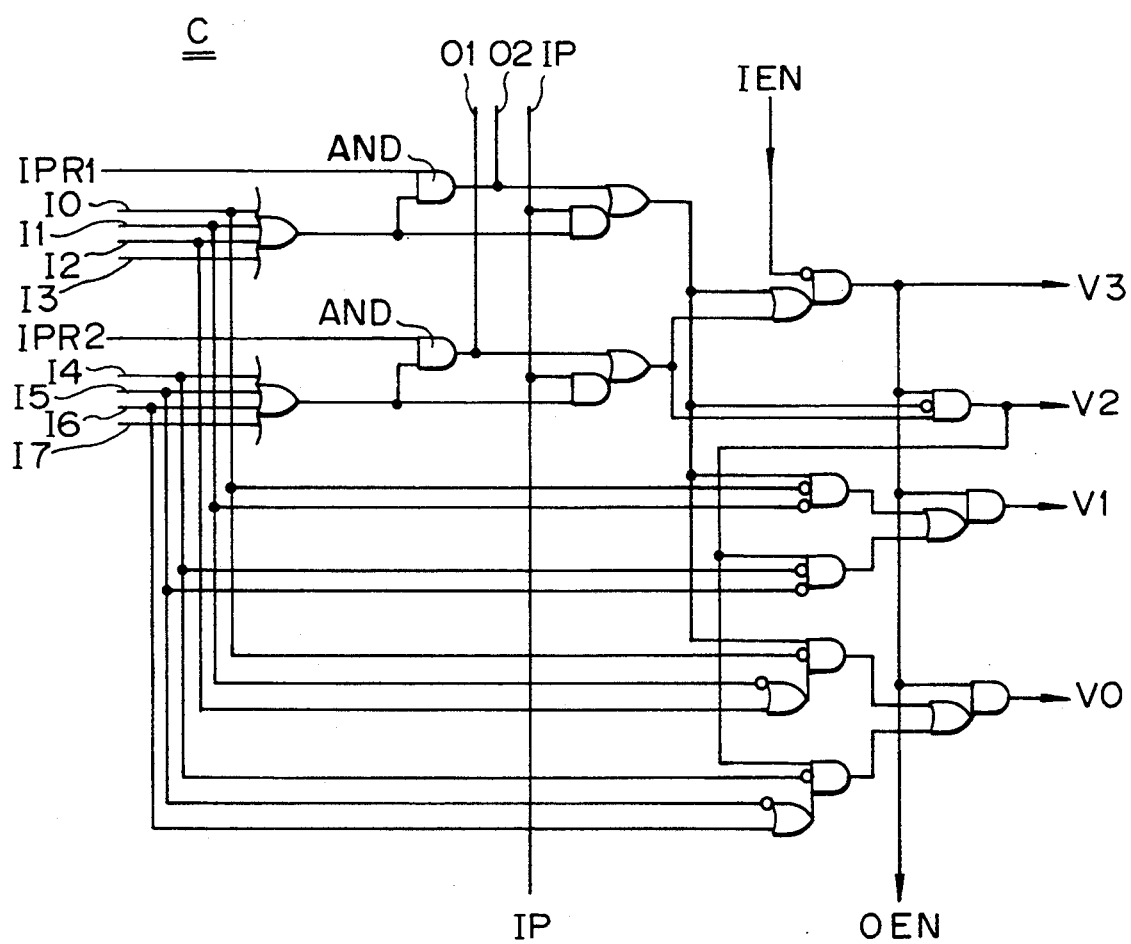
FIG. 12 is a circuit diagram showing an example of a circuit block C included in the priority judging circuit.

In FIG. 9, each of NMI, TRAP0 to TRAP3, IRQ0 to IRQ7, TAIC0 to TAIC3, TACM0, TACM1, TAOV, TBCM0, TBCM1, TBOV, SREND, STEND, SERR, and ADEND indicates a signal corresponding to the kind of interruption which has already been described in conjunction with FIGS. 5 and 6 mentioned above. VEC0 to VEC5 denote vector numbers corresponding to 84 in FIG. 1. FIG. 10 shows a detailed example of a circuit block A in FIG. 9. FIG. 11 shows detailed example of a circuit block B in FIG. 9. FIG. 12 shows a detailed example of a circuit block C in FIG. 9. In FIGS. 10 to 12, reference numerals 10 to 17 denote input terminals of interruption signals of NMI or the like. Outputs V0 to V2 in each of FIGS. 10 to 12 are signals of three bits indicating that the interruption which has been inputted from either one of the input terminals 10 to 17 is accepted. The signals V0 to V2 which are generated from the respective blocks are set to the foregoing signals VEC0 to VEC2 through OR circuits 800 to 802 shown in FIG. 9, respectively. The signal V3 is a signal to identify that the output signals V0 to V2 are output signals from which circuit blocks. Signals VEC3, VEC4, and VEC5 in FIG. 9 are formed by the signal V3 that is outputted from each block.

In FIGS. 11 and 12, IEN denotes a control signal which is given from the upper side circuit block (circuit block arranged on the upper side in FIG. 9). In FIGS. 10 to 12, OEN denotes a control signal which is given to the lower side block. The control signal OEN is set to the "1" level when the interruption is accepted in the relevant block or when the interruption has already been accepted in the circuit block on the upper side of the relevant block. The control signal OEN at the "1" level is used to inhibit the acceptance of the interruption in the lower circuit block. For instance, when the interruption signal which is supplied to the block A is activated and the relevant interruption is accepted, OEN shown in FIG. 10 is set to the "1" level. In the lower blocks which sequentially receive the "1" level signal OEN, all of the signals V0 to V3 are forcedly set to the "0" level. The above acceptance denotes that the interruption request signal has been set into the active state and supplied to the interruption control circuit.

As shown in FIGS. 11 and 12, the internal interruption signals from the built-in functional blocks (the timers 41 and 42, A/D converter 6, SCI 5, or the like in FIG. 1) and the external interruption request signals which are sent from the input/output ports produce AND signals with the corresponding bits of the register IPR. In FIGS. 11 and 12, 01, 02, 03, 04, and 05 are set to the "1" level in response to the state in which both of the interruption factor and the bit of the register IPR corresponding to the interruption factor have been set to the "1" level. In other words, the bit is set to the "1" level when the interruption signal of the factor whose interruption has been permitted by the corresponding bit of the register IPR is activated. Those signals which are outputted from the blocks B and C are supplied to an OR circuit 805 shown in FIG. 9. An output of the OR circuit 805 is supplied together with the U2C bit to an NOR gate 804. IP in FIGS. 11 and 12 denotes an output control signal of the NOR gate 804 in FIG. 9. When the control signal IP is at the "1" level, the interruption can be accepted even for the interruption factors in which the bits IPR0 to IPR7 have been set to "0". A state in which the control signal IP is at the "1" level corresponds to a state in which the U2C bit is at the "0" level (the U2 bit is set to the user's bit and the interruption mask bit is set to only one bit) and the interruption corresponding to the bit in which "1" has been set into the register IPR is not generated yet. In this state, all of the interruption factors can be accepted.

In the circuit construction shown in FIGS. 9 to 12, the AND between each of the interruption request signals which are sent from the built-in functional blocks and the input/output ports and the corresponding bit of the register IPR is got by an AND gate (AND in FIGS. 11 and 12). The AND signal is subjected to the priority judgment control in a state (1) in which the U2C bit and the I bit have been set to "1" and the U2 bit has been cleared to "0" or in a state (2) in which the U2C bit has been cleared to "0" and the OR signal (output of the OR circuit 805) of all of the foregoing AND signals is at the "1" level. In the states other than the above states (1) and (2), for example, as mentioned above, in a state in which the U2C bit is at the "0" level (the U2 bit is set to the user's bit and the interruption mask bit is set to only one bit) and the interruption corresponding to the bit in which "1" has been set into the register IPR is not yet generated, the interruption request signal is directly subjected to the priority judgment control irrespective of the output of the AND gate AND. In the above interruption priority judgment, when either one of the inputted signals is at the "1" level, an interruption request is sent to the CPU 1 and the vector number of the signal of the smallest vector number among the "1" level signals is given. The NMI OR TRAP command or the like is subjected to the priority judgment irrespective of the above states. Such a priority judgment is described further in detail in "H8/330, HD6473308, HD6433308, Hardware Manual", Hitachi Ltd., published on August, 1985, or the like.

As shown in FIG. 12, the above AND signals can be made common with respect to a plurality of interruption request signals in which the IPR is commonly used. After IRQ4, since the IPR is set to a 4-factor unit (including a reservation), lower two bits are independently encoded. To perform the priority judgment, it is sufficient to execute both of the encoding of upper four bits and the selection of lower two bits. Due to this, increases in logical and physical scales can be minimized.

Figure 13:
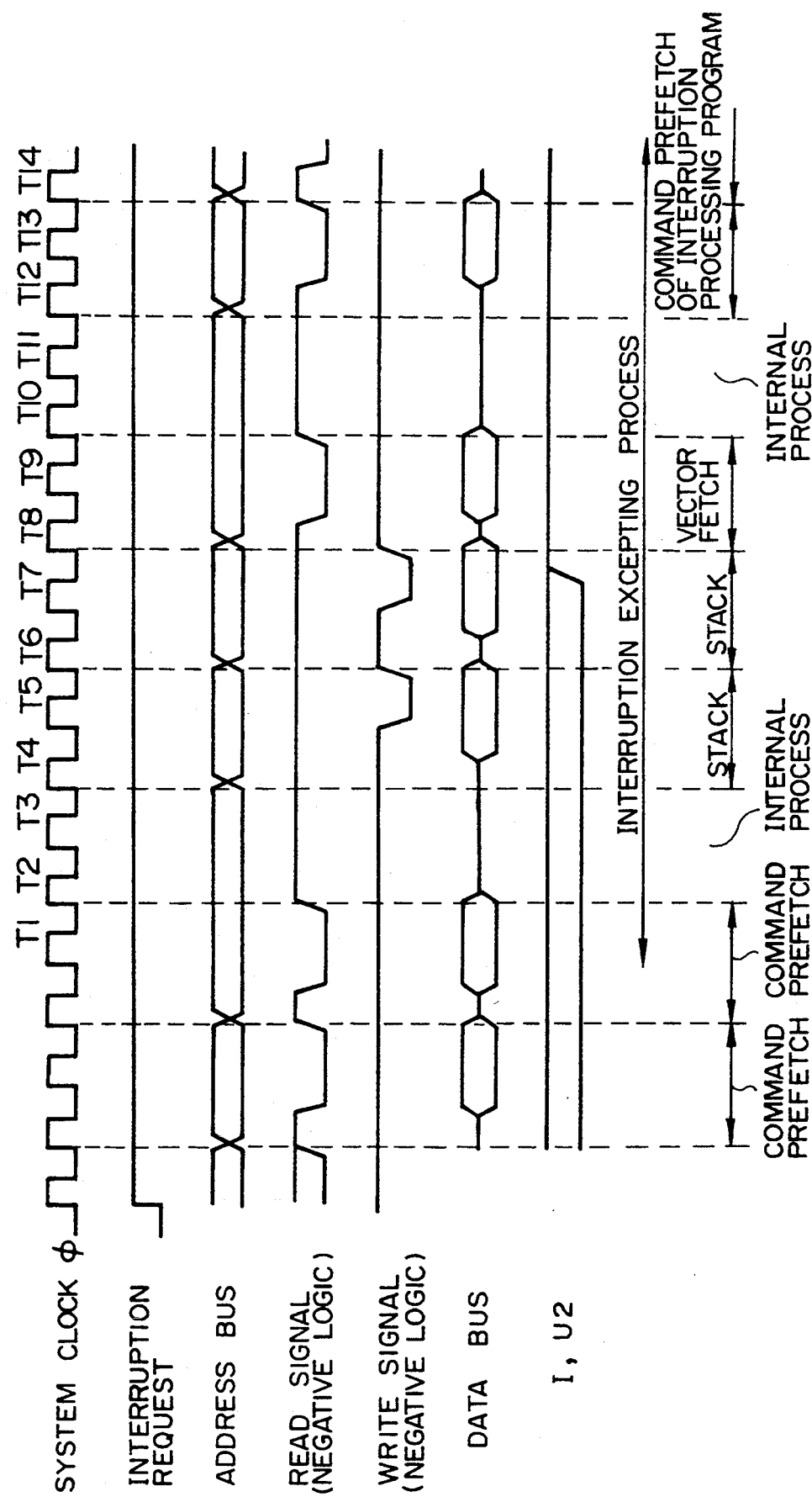
FIG. 13 is a timing chart showing an example of an interruption excepting process by the CPU.

FIG. 13 shows a timing chart for the interruption excepting process of the CPU 1.

The interruption excepting process is a transient process which is automatically executed when the CPU 1 accepts the interruption. First, when the CPU 1 has already prefetched a command at a time point of the acceptance of the interrupting process, the command is finished in a state T1 and internal processes such as a decrement of stack pointers (R7H, R7L) or the like are subsequently executed in the CPU 1 in states T2 and T3. After that, in states T4 to T7, the program counter PC and the condition code register CCR are saved into the stack areas. In state T7, the vector number which is outputted from the interruption control circuit 8 is supplied into the CPU 1 and, further, in the case where both of the I bit and the U2C bit have been set to "1", the U2 bit is also set to "1". In states T8 and T9, the branch destination address is read out from the address according to the vector number, for instance, from the address in which the vector number was doubled. In states T10 and T11, the branch destination address is supplied into the program counter PC. After state T12, the interruption processing programs are sequentially read out from the branch destination address. In state T14, the interruption excepting process is finished. After that, the head command of the interruption processing program is executed.

Figure 14:
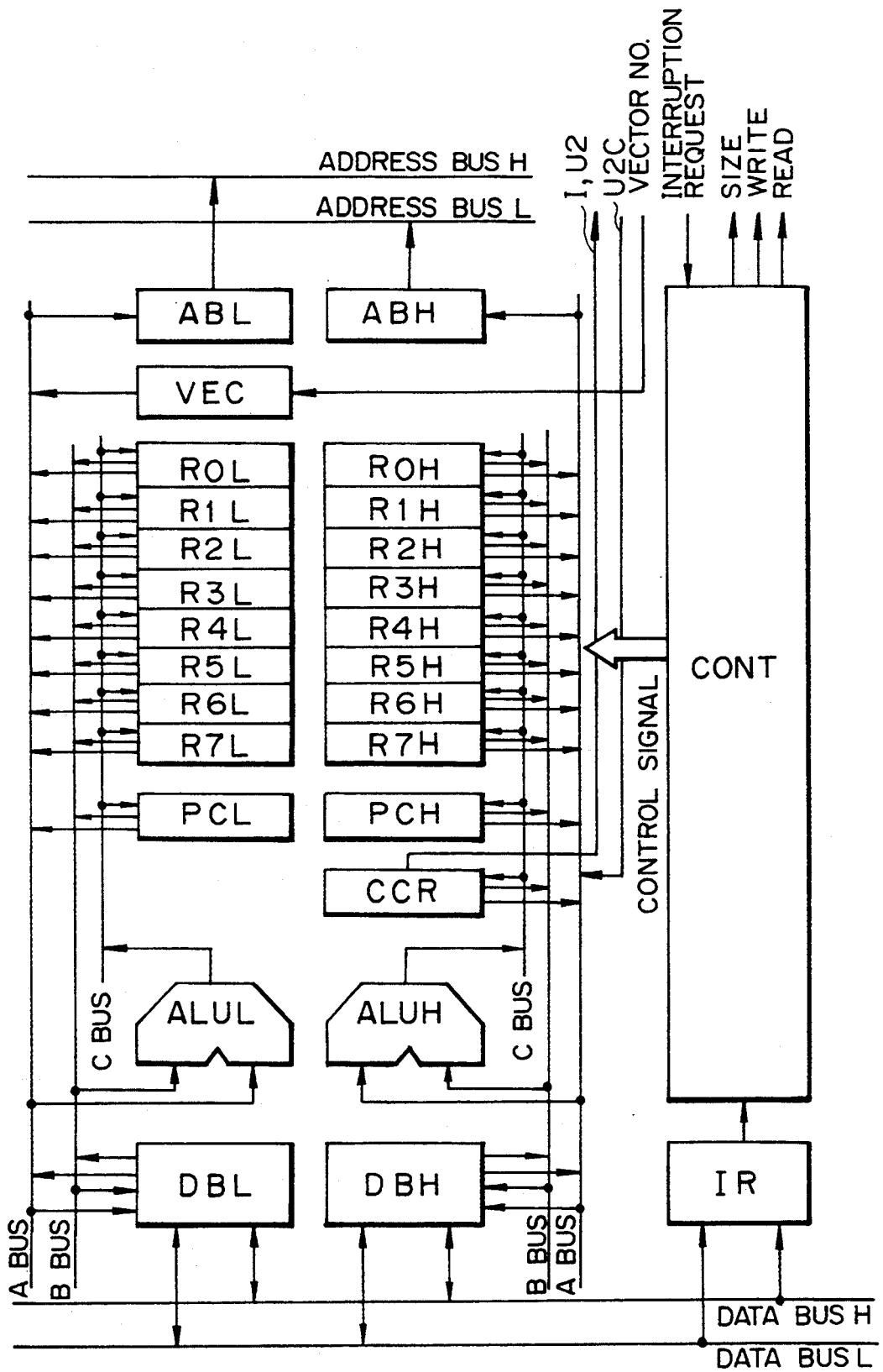
FIG. 14 is a block diagram showing an example of the CPU.

FIG. 14 shows a block diagram of an embodiment of the CPU 1.

The CPU 1 is constructed by: a command register IR; a control section CONT; data buffers DB (DBL, DBH); address buffers AB (ABL, ABH); arithmetic logic operation units ALU (ALUL, ALUH); general registers R0H to R7H and R0L to R7L; program counters PC (PCL, PCH); and condition code register CCR. The command register IR and data buffers DB are connected to internal data buses H and L. The address buffers are connected to internal address buses H and L. Further, the control section CONT generates a read signal, a write signal, or the like. The data buffers DB, address buffers AB, arithmetic logic operation units ALU, general registers R0H to R7H and R0L to R7L, program counters PC, and condition code register CCR are mutually connected by internal buses A, B, and C. Since a detailed internal construction of the CPU 1 is not directly concerned with the present invention, its further detailed description is omitted here.

Figure 15:
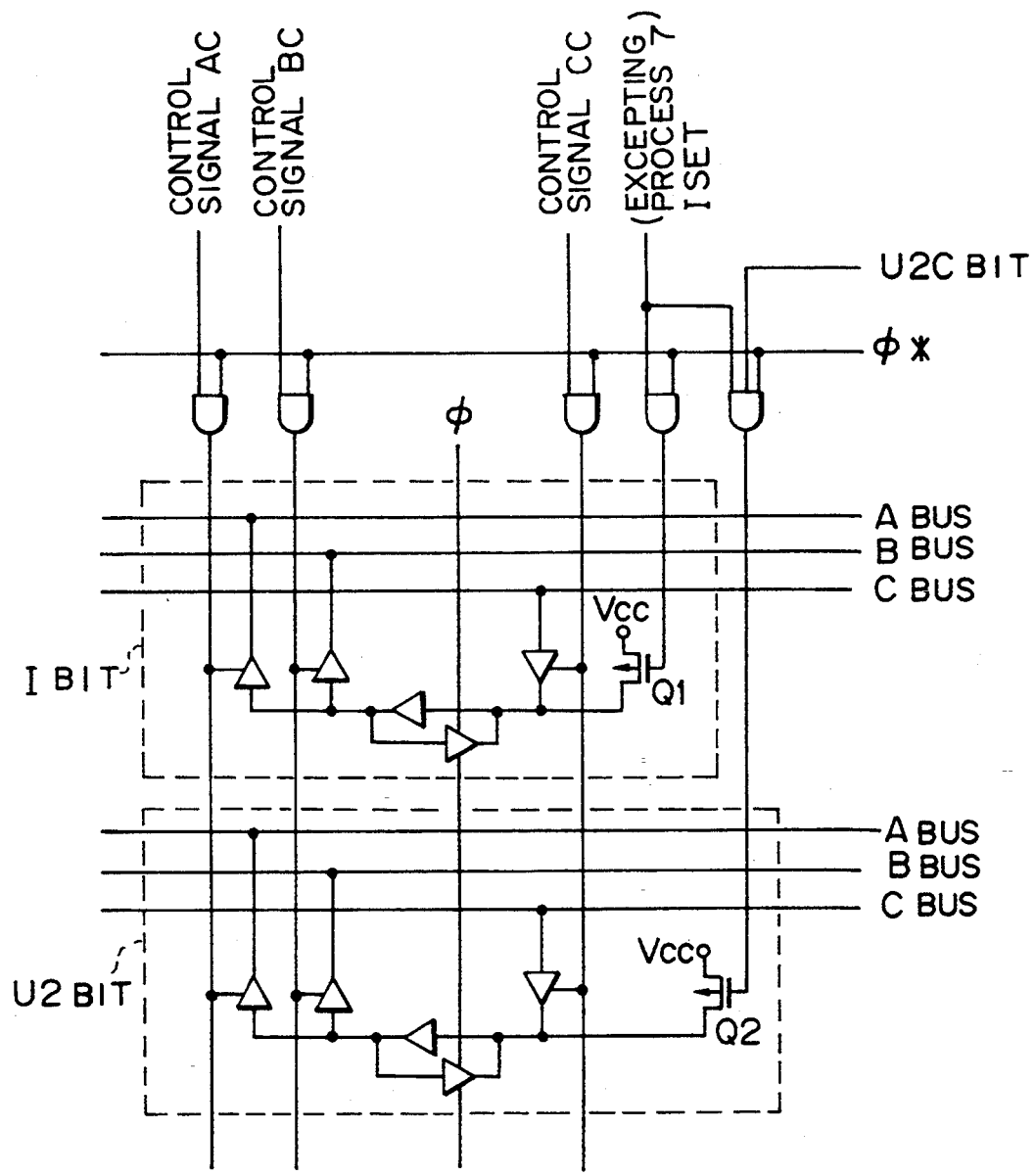
FIG. 15 is a circuit diagram showing an example of a condition code register of the CPU.

FIG. 15 is a circuit diagram as a specific example of the I bit and U2 bit of the condition code register CCR of the CPU 1.

In the condition code register CCR, the data input from the bus C and the data output to the buses A and B are executed by control signals AC, BC, and CC which are generated from the control section CONT for a period of time during which a system clock $\phi$ is at the 0 level (a symbol * shown in FIG. 15 denotes a signal whose phase has been inverted for a signal to which * is not given). Further, in the control section CONT, an I-bit set signal ISET is outputted in the state T7 for the interruption excepting process. The I bit is set to "1" by a P channel type MOS transistor Q1 for a period of time during which the system clock $\phi$ is at the "0" level When the U2C bit has been set to "1", the U2 bit is set to "1" by the AND signal of the I-bit set signal ISET and the output of the U2C bit by a P channel type MOS transistor Q2 for a period of time during which the system clock $\phi$ is at the "0" level.

According to the above embodiment, the following effects are obtained.

(1) Since the U2 bit can be selectively used as an interruption mask bit, a high efficiency or a high function of the interrupting process can be realized while minimizing the increases in physical and logical scales.

(2) In the case where the selection as an interruption mask bit is not performed to the U2 bit, the use as a user's bit can be secured. Therefore, by using the user's bit, the softwares can be easily managed and its executing efficiency can be improved.

(3) Whether the U2 bit of the condition code register CCR is used as an interruption mask bit or is used as a user's bit can be selected by the circumstances of the software or hardware, so that a high efficiency of the interrupting process can be easily realized while keeping an executing efficiency of the software.

(4) The U2C bit to set whether the U2 bit of the condition code register CCR is used as an interruption mask bit or is used as a user's bit is provided in the outside of the CPU 1, so that the operating program of the CPU which has the interruption mask bit of only one bit can be easily used without almost changing.

(5) Since a state in which a part of the interruptions is permitted in accordance with the set content of the register IPR can be realized, it is possible to flexibly cope with various kinds of interruption processing states.

(6) Since the register IPR whose interruption priority is designated is set to one register as a unit register, such a register IPR can be easily saved and recovered. The priority can be efficiently changed.

(7) The executing efficiency of the software can be improved while minimizing the increases in logical and physical scales of the CPU and microcomputer.

Although the invention made by the present inventors has practically been described on the basis of the preferred embodiments, the invention is not limited to those embodiments. Many modifications and variations are possible within the spirit and scope of the appended claims of the invention.

For instance, the numbers and kinds of the built-in functional blocks and interruption factors, the number of bits of IPR, or the like are not limited. The IPR can be also constructed by two bytes (one word). So long as the CPU can execute a word size command, it is sufficient to merely change the data size of the command from the byte to the word. It is enough that the IPR is constructed by a unit of one data which can be handled by the CPU. However, for instance, if the unit exceeds the one-data unit such as three bytes or more, the CPU cannot handle the whole IPR in a lump, so that it is disadvantageous. The interruption control circuit or the specific circuit example of the CPU or the like is not limited to the above embodiment but many modifications and variations are possible. The register construction of the CPU, the register construction of the interruption control circuit, or the like are not limited to those of the above embodiments. For instance, the U2C bit can be included in the same register as another control bit.

The invention made by the present inventors has been described above mainly with respect to the case it was applied to the single chip microcomputer as a utilization field as a background of the invention. The invention, however, is not limited to such a case but can be also widely applied to other data processing apparatuses which have been constructed as semiconductor integrated circuits. The invention can be applied to at least a data processing apparatus of a condition having a function to mediate when a plurality of phenomena occur.

Effects which are derived by the embodiments disclosed in the present invention will now be briefly described hereinbelow.

That is, by providing designating means for selecting whether a predetermined bit of the register means such as a condition code register is used as an interruption mask bit or a user's bit, either one of the above two cases can be selected in accordance with the circumstances of the software or hardware. Therefore, it is possible to obtain a data processing apparatus which can realize a high efficiency of the interrupting process while keeping the executing efficiency of the software and also minimizing the increases in physical and logical scales.

By providing the designating means such as a U2C bit to the outside of the CPU, the operating programs of the CPU having the interruption mask bit of only one bit can be easily used without changing.

By providing the interruption priority designating register which serves as register means of one unit such as a register IPR having a plurality of bits and in which one bit of such register means is set to correspond to one or a plurality of interruption factors, and by realizing a state in which a part of the interruptions is permitted in accordance with the set content of such an interruption priority designating register, it is possible to flexibly cope with various kinds of interruption processing situations.

By setting the interruption priority designating register such as an IPR to the I register as a unit register, such a register can be easily saved and recovered and the priority can be efficiently changed.

What is claimed is:

1. A data processing apparatus comprising:
a central processing unit which has at least one first memory bit and at least one second memory bit, the central processing unit executing an interrupting process indicated by an interruption identification signal in response to a first interruption request signal and said interruption identification signal;
first designating means for generating a designation signal indicating whether the central processing unit is in a first designating state; and
interruption control means configured to receive as input at least a plurality of second interruption request signals respectively corresponding to a plurality of interruption factors, a first bit state signal indicative of a state of said at least one first memory bit, a second bit state signal indicative of a state of said at least one second memory bit, and said designation signal, the interruption control means accepting or masking at least one interruption request signal of said plurality of second interruption request signals on the basis of both the first bit state signal and the second bit state signal in response to said designation signal indicating the first designating state, and the interruption control means accepting or masking the at least one interruption request signal of said plurality of second interruption request signals on the basis of the first bit state signal in response to said designation signal indicating a state different from the first designating state, the interruption identification signal corresponds to one of said accepted at least one interruption request signal of the plurality of second interruption request signals and is supplied to the central processing unit, and the first interruption request signal is supplied to the central processing unit in response to one of said accepted at least one interruption request signal of the plurality of second interruption request signals.

2. An apparatus according to claim 1, wherein in response to said designation signal indicating a state different than the first designating state, the state of the second memory bit changes in response to only a predetermined command which is executed by the central processing unit.

3. An apparatus according to claim 1, wherein said first designating means generates said designation signal in accordance with a predetermined command which is executed by the central processing unit.

4. An apparatus according to claim 1, wherein said first designating means is disposed in an address space of the central processing unit.

5. An apparatus according to claim 1, wherein said interruption control means is disposed in an address space of the central processing unit.

6. An apparatus according to claim 1, wherein in response to said designation signal indicating the first designating state, said interruption control means is configured such that (a) in response to the first bit state signal indicating a first state, the interruption control means accepts all of the plurality of second interruption request signals without masking, (b) in response to the first bit state signal indicating a second state and the second bit state signal indicating a third state, the interruption control means accepts a part of the plurality of second interruption request signals and masks the remaining second interruption request signals, and (c) in response to the first bit state signal indicating the second state and the second bit state signal indicating a fourth state, the interruption control means masks all of the plurality of second interruption request signals.

7. An apparatus according to claim 6, further having a second designating means for designating said part of the plurality of second interruption request signals.

8. An apparatus according to claim 7, wherein said second designating means designates said part of the plurality of second interruption request signals in accordance with a predetermined command which is executed by the central processing apparatus.

9. An apparatus according to claim 7, wherein said second designating means includes a plurality of third memory bits,
- each of said plurality of third memory bits is set to correspond to at least one signal among said plurality of second interruption request signals, each of said plurality of second interruption request signals is set to correspond to at least one of said plurality of third memory bits,
- in response to each of the plurality of third memory bits being in the first state, including said one or more number of signals which have been set to correspond to said third memory bits in said part of the second interruption request signals, and
- in response to each of the plurality of third memory bits being in the second state, including one or more number of signals which have been set to correspond to the third memory bits in said remaining second interruption request signals.

10. An apparatus according to claim 9, wherein the states of said plurality of third memory bits are changed in accordance with a predetermined command which is executed by the central processing unit.

11. An apparatus according to claim 1, wherein in response to said designation signal indicating a state different than the first designating state, said interruption control means is configured in a manner such that (a) in response to the first bit state signal indicating the first state, the interruption control means accepts all of the plurality of second interruption request signals, and (b) in response to the first bit state signal indicating the second state, the interruption control means masks all of the plurality of second interruption request signals.

12. An apparatus according to claim 1, wherein
at least one of a plurality of third interruption request signals corresponding to a predetermined interruption factor is inputted to said interruption control means, and
the interruption control means accepts said at least one of the plurality of third interruption request signals irrespective of the first bit state signal and said second bit state signal.

13. An apparatus according to claim 1, further including a plurality of signal generating sections for generating said plurality of second interruption request signals,
wherein each of said plurality of signal generating sections has a fourth memory bit, and
in response to said fourth memory bit being in the first state, each of said plurality of signal generating sections generates one of the second interruption request signals, and in response to said fourth memory bit being in the second state, each of the signal generating sections does not generate one of the second interruption request signals.

14. An apparatus according to claim 13, wherein the states of said each fourth memory bit are changed in accordance with a predetermined command which is executed by the central processing unit.

15. An apparatus according to claim 1, wherein said central processing unit has a condition code register, and said at least one first memory bit and said at least one second memory bit are included in the condition code register.

16. A data processing apparatus comprising:
a central processing unit including at least one memory bit, the central processing unit executing an interrupting process indicated by an interruption identification signal in response to a first interruption request signal and said interruption identification signal;
first designating means for generating a designation signal indicating whether the central processing unit is in a first designating state; and
interruption control means which is configured to receive at least a plurality of second interruption request signals respectively corresponding to a plurality of interruption factors, a bit state signal indicative of a state of said at least one memory bit, and said designation signal, the interruption control means accepting or masking each of said plurality of second interruption request signals on the basis of the bit state signal in response to said designation signal indicating the first designating state, and in response to the designation signal indicating a state different than the first designating state, (i) each of the plurality of second interruption request signals is accepted irrespective of the bit state signal, (ii) the interruption identification signal corresponding to at least one of said accepted signals is supplied to the central processing unit, and (iii) the first interruption request signal is supplied to the central processing unit in response to at least one of said accepted signals.

17. An apparatus according to claim 16, wherein in response to said designation signal indicating a state different from the first designating state, the state of the second memory bit is changed in response to only a predetermined command which is executed by the central processing unit.

18. An apparatus according to claim 16, wherein said central processing unit has a condition code register and said at least one memory bit is included in said condition code register.

19. A data processing apparatus comprising:
a central processing unit which has at least one first memory bit and at least one second memory bit, the central processing unit executing an interrupting process indicated by an interruption identification signal in response to a first interruption request signal and said interruption identification signal;
first designating means for generating a designation signal indicating whether the central processing unit is in a first designating state; and
interruption control means configured to receive a plurality of second interruption request signals corresponding to a plurality of interruption factors, a first bit state signal indicative of a state of said at least one first memory bit, a second bit state signal indicative of a state of said second memory bit, and said designation signal, said interruption control means is configured such that in response to said designation signal indicating the first designating state, (a) in response to the first bit state signal indicating a first state, the interruption control means accepting all of the plurality of second interruption request signals without masking, (b) in response to the first bit state signal indicating a second state and the second bit state signal indicating a third state, the interruption control means accepts a fraction of the plurality of second interruption request signals and masks the remaining second interruption request signals, and (c) in response to the first bit state signal indicating the second state and the second bit state signal indicating a fourth state, the interruption control means masking all of the plurality of second interruption request signals and in response to said designation signal indicating a state different from the first designating state, the interruption control means accepting or masking the at least one interruption request signal of said plurality of second interruption request signals on the basis of only the first bit state signal.

* * * * *